United States Patent [19]

Panek

[11] Patent Number: 4,916,818

[45] Date of Patent: Apr. 17, 1990

[54] LONG REACH TREE TRIMMER

[76] Inventor: Gregory E. Panek, 20738 Woodburn, Southfield, Mich. 48075

[21] Appl. No.: 329,362

[22] Filed: Mar. 27, 1989

[51] Int. Cl.⁴ ............................................. B23D 57/02
[52] U.S. Cl. ....................................... 30/383; 30/296.1
[58] Field of Search ................................... 30/381–383, 30/386, 122, 296 R

[56] References Cited

U.S. PATENT DOCUMENTS 4,341,017  7/1982  Janczak .................................. 30/381
4,654,971  4/1987  Fettes et al. ........................... 30/383

Primary Examiner—Douglas D. Watts

[57] ABSTRACT

A remotely-operated chain saw apparatus useful for cutting overhead branches from ground level. A telescopic tube-shaft means extends between an engine at ground level and a gear box attached to a chain saw guide bar. A person standing on the ground can use the apparatus to cut off overhead branches without leaving the ground. The chain saw is adjustable so that the cutter chain can cut into the upper surface of a tree branch or into a side surface of the branch.

8 Claims, 2 Drawing Sheets

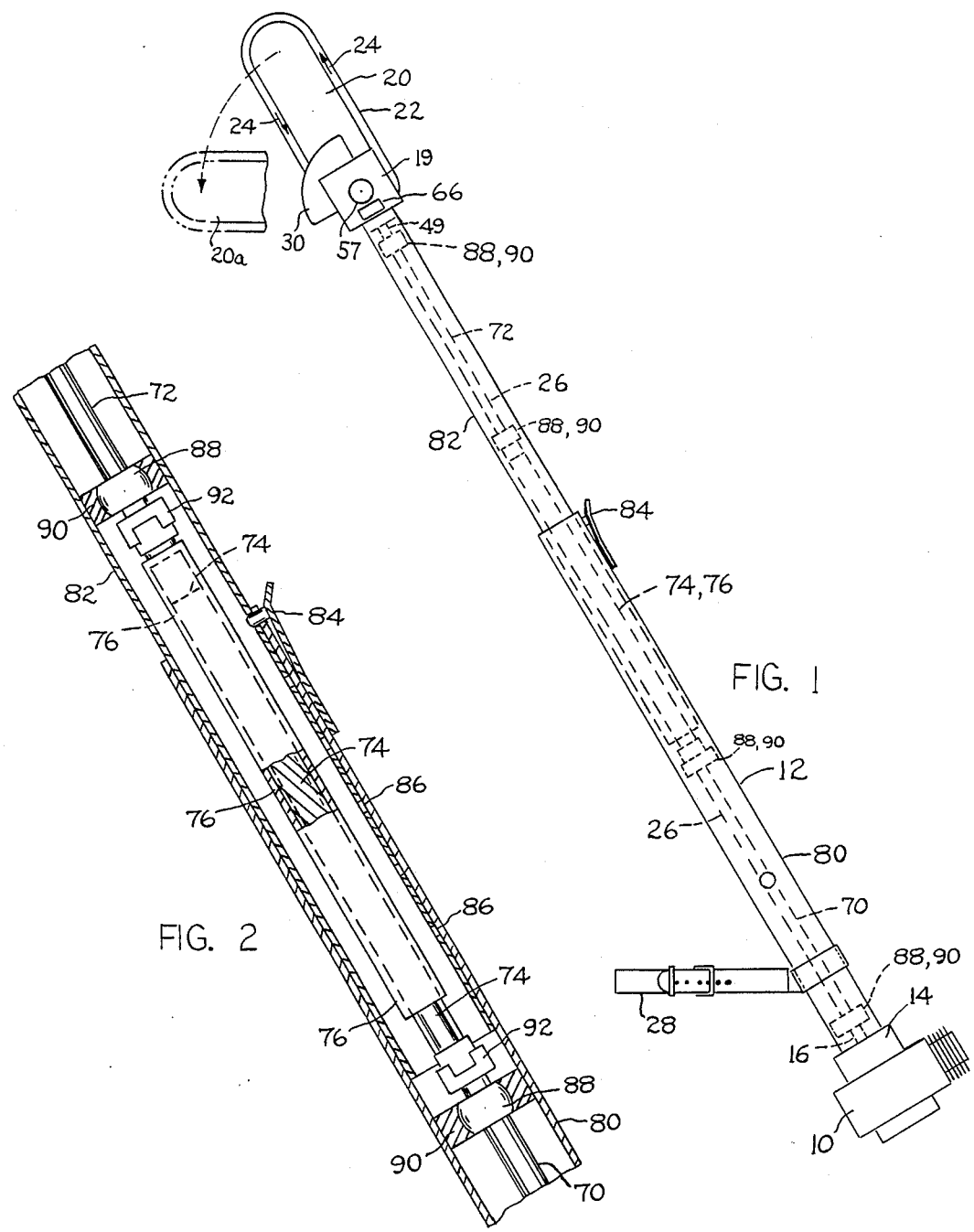

LONG REACH TREE TRIMMER

BACKGROUND AND SUMMARY OF THE INVENTION

This invention relates to a remotely-operated chain saw for cutting tree branches beyond the reach of a person standing at ground level underneath a tree. In some respects the invention might be considered an improvement or variant on the structural arrangement shown in U.S. Pat. No. 4,341,017 to J. Janczak.

The Janczak patent shows an arrangement wherein an engine 23 is located at the lower end of a tubular handle 2 to drive a hydraulic pump 24. Hydraulic lines 4 and 5 extend within tubular handle 2 to a hydraulic motor 13 located at the upper end of the handle. A chain saw apparatus is connected to the hydraulic motor for cutting tree branches.

My invention seeks to improve the apparatus of the Janczak patent in two respects. First, I have designed the elongated handle structure to include two telescopically-connected tubes, such that the apparatus can be extended or retracted to reach tree branches at various different locations along the tree trunk, e.g. fifteen or more feet from ground level.

Second, I provide an adjustable connection between the chain saw and the tubular handle, whereby the cutter chain can be positioned at different inclinations across the tree branch, e.g. resting directly on the upper surface of the branch or inclined against a side surface of the tree branch, depending primarily on available clearances.

My apparatus is designed to minimize the weight imposed on the chain saw apparatus at the outer (upper) end of the elongated tubular handle. Rather than using a hydraulic motor at the upper end of the handle, I drive the saw apparatus mechanically from ground level via a rotary shaft means extending coaxially within the tubular handle. The drive mechanism comprises a right angle gear box at the upper end of the elongated handle.

THE DRAWINGS

FIG. 1 is an elevational view of an apparatus embodying my invention.

FIG. 2 is an enlarged fragmentary sectional view of a portion of the FIG. 1 apparatus.

FIG. 3 is taken on line 3—3 in FIG. 4.

DESCRIPTION OF A PREFERRED EMBODIMENT OF THE INVENTION

Figure 3:
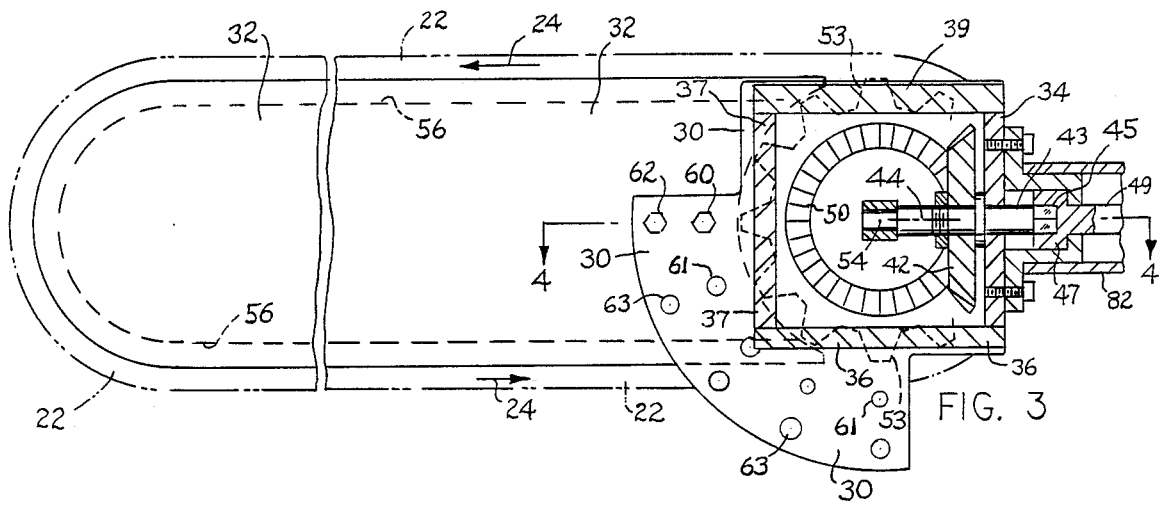
FIG. 3 is an enlarged sectional view of a gear box-chain saw mechanism used in the FIG. 1 apparatus.

FIG. 1 shows an apparatus that is broadly similar, in a functional sense, to the apparatus shown in U.S. Pat. No. 4,341,017 to J. Janczak. An internal combustion engine 10 is attached to the lower end of an elongated tube means 12. The engine preferably includes a centrifugal clutch means 14 for delivering power to a stub shaft 16 when the engine reaches a predetermined r.p.m. sufficient to provide the necessary drive force.

The upper end of tube means 12 is attached to a right angle drive gear box designated generally by numeral 19. The gear box is attached to a chain saw apparatus 20 that includes a cutter chain 22 arranged to move in the arrow 24 direction (FIG. 1), whereby the chain is enabled to cut through a tree branch, not shown. A rotary telescopic shaft means 26 extends within tube means 12 to transmit a rotary drive force from stub shaft 16 to an input drive gear in gear box 19.

A suitable harness mechanism 28 is connected to tube means 12 near its lower end, such that the user can transport the apparatus from one tree to another, and/or manipulate the apparatus into proximity to a designated overhead tree branch. In lieu of a harness mechanism, a tripod structure could be used to provide the apparatus support function.

It should be noted that tube means 12 and shaft means 26 are both telescopic in nature, such that gear box 19 (and chain saw apparatus 20) can be raised or lowered, as necessary to reach particular tree branches without unduly disturbing the inclination angle of tube means 12. Also, saw apparatus 20 is adjustably related to gear box 19 so that the cutter chain can have different orientations on the tree branch. FIG. 1 shows in full lines one orientation of the chain saw apparatus and in dashed lines 20a a second orientation. Other intermediate orientations, not shown, are possible.

Figure 4:
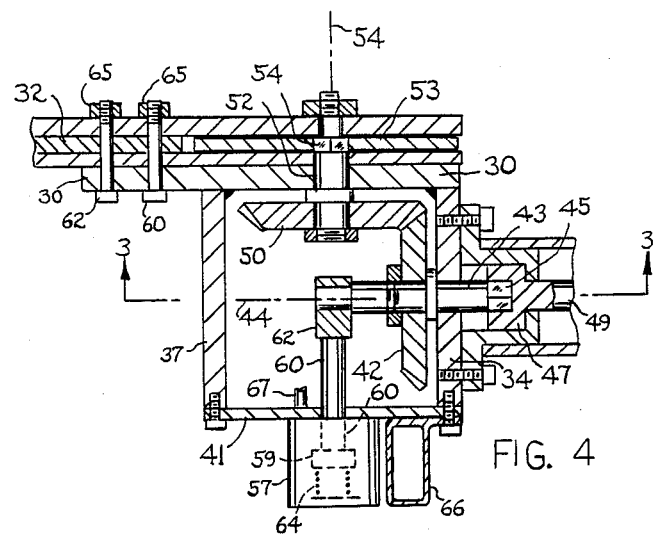
FIG. 4 is a sectional view on line 4—4 in FIG. 3.

FIGS. 3 and 4 show the general relation between the gear box and the chain saw apparatus. The gear box includes a flat rear wall 30 positionable against a chain saw guide bar (or plate) 32. Four walls 34, 36, 37 and 39 are welded to wall 30 to form a gear box housing; a removable cover plate 41 is screwed onto the housing. The cover and housing walls may be light weight aluminum.

An input gear 42 is secured to a rotary shaft 43 that extends out of the gear box housing on an axis 44. A square end section 45 on shaft 43 seats in a socket structure 47 suitably secured to a shaft 49, only partly shown in FIGS. 3 and 4. Rotation of shaft 49 causes gear 42 to rotate around axis 44.

An output gear 50 is suitably attached to a shaft 52 that is affixed to a chain drive sprocket 53; square section 54 of shaft 52 fits into a square hole in the sprocket to provide the necessary drive connection. The overall arrangement is such that rotation of input gear 42 on axis 44 produces rotation of output gear 50 and sprocket 53 around axis 54. Sprocket 53 drives a conventional cutter chain 22 along (around) guide bar 32.

Guide bar 32 is a conventional structure that can be formed by three flat plates positioned one against another to provide a peripheral groove 56 for containment of the cutter chain. In order to lubricate and cool the chain, I provide a small oil pump 57 (FIG. 4). The pump can comprise a piston 59 connected to a rod 60 that rides on a cam 62 attached to shaft 43. A compression spring 64 keeps rod 60 on the cam.

As shaft 43 rotates, piston 59 reciprocates back and forth in the pump housing to pump oil from a tank 66 through a line 67. Line 67 connects with a port in guide bar 32 that communicates with a point on groove 56. In this way, it is possible to supply coolant (lubricant) to the cutter chain.

The gear box housing is adjustable on guide bar 32 so that the guide bar can be rotated around axis 54. Housing wall 30 has two sets of external openings 61 and 63 therethrough centered on axis 54, so that bolts 60 and 62 can be extended through selected ones of the openings into openings formed in guide bar 32. Nuts 65 can be tightened on the bolts to rigidly, but adjustably, attach guide bar 32 to the gear box housing.

FIG. 1 shows the connecting shaft structure 26 between stub shaft 16 (at the engine) and stub shaft 49 (at the gear box). Shaft structure 26 comprises a first elongated shaft section 70, a second elongated shaft section 72, and third and fourth shaft sections 74 and 76. Shaft sections 74 and 76 telescope on one another for axial slidable adjustment (to increase or decrease the effective haft length).

Shaft structure 26 is rotatably disposed within an elongated extensible tube means 12 that includes a lower tube 80 and an upper tube 82; end sections of the tubes overlap. A suitable detent mechanism 84 is mounted on one of the tubes for projection into selected openings 86 in the other tube, to hold the tubes in selected positions of adjustment.

To minimize bending strains in shaft structure 26, the various shaft sections may be connected together by means of universal joints. Thus, as seen in FIG. 2, the upper end of shaft section 70 is a spherical rod end 88 seated in a spherical socket 90; the lower end of shaft section 72 is similarly configured. Each rod end 88 is attached to one end of a universal joint 92; the other end of the universal joint is attached to the associated telescopic shaft section 74 or 76.

Shaft sections 74 and 76 have slidably interengaged splines or keys within grooves or keyways, such that the shafts can slide axially while transmitting a rotary drive force from shaft section 70 to shaft section 72. Axial adjustment of shaft sections 74 and 76 takes place while the shaft system is in a stationary non-rotating mode.

The lower end of shaft 70 may be connected to stub shaft 16 via a spherical rod end similar to that shown at 88, 90 in FIG. 2. Similarly, the upper end of shaft 72 may be connected to stub shaft 49 via a similar spherical rod end connection. Socket structures can be incorporated into the spherical rod ends to provide some play in the connections, whereby the various shaft axes can be slightly angulated, as may be necessary to accommodate bending strain in tubes 80 and 82.

The drawings show one form that the invention can take. Other forms are possible.

I claim:

1. A saw operated by a person standing on the ground for cutting tree branches above the person's reach, comprising:
    an engine located at ground level;
    a right angle drive gear box located an appreciable distance above the engine; said gear box including a housing, an input gear rotatable on a first axis, and an output gear rotatable on a second axis at right angles to the first axis;
    telescopic tube means interconnecting the engine and the gear box housing, whereby the gear box can be raised or lowered;
    a chain saw guide bar attached to the gear box housing; a chain drive sprocket connected to the output gear, and a cutter chain trained around the guide bar and sprocket;
    and a rotary shaft means extending within the telescopic tube means for transmitting a rotary drive force from the engine to the input gear in the gear box; said shaft means comprising telescoping shaft sections adjustable axially within the telescopic tube means;
    said gear box housing comprising a flat wall positioned against the chain saw guide bar, and arcuately adjustable attachment means extending through the flat wall and guide bar for attaching said guide bar to the gear box housing; said arcuately adjustable attachment means being centered on said second axis, whereby the housing and chain saw guide bar can be adjusted around said second axis without disturbing the relation between the sprocket and the output gear.

2. The saw of claim 1 wherein the arcuately adjustable attachment means comprises two sets of openings in the gear box flat wall; each set of openings being centered on said second axis but at different radial distances form said second axis.

3. The saw of claim 2 wherein the arcuately adjustable attachment means comprises two bolts extendable through respective ones of the openings in the gear box flat wall.

4. The saw of claim 1 wherein the telescopic tube means comprises a lower tube and an upper tube, said tubes being slidably telescoped one within the other so that end sections of the tubes overlap;
    said rotary shaft means comprising a first shaft section located within the lower tube, a second shaft section located within the upper tube, and third and fourth shaft sections telescopically connected together between said first and second shaft sections.

5. The saw of claim 5 and further comprising a first universal joint between the first shaft section and the third shaft section, and a second universal joint between the second shaft section and the fourth shaft section.

6. The saw of claim 1 and further comprising an oil pump driven by the rotary shaft means for supplying oil to the cutter chain.

7. The saw of claim 6 wherein said oil pump is mounted on the gear box housing.

8. The saw of claim 6 wherein the oil pump is cam-operated.

* * * * *